S. L. C. COLEMAN.
VEHICLE BRAKE.
APPLICATION FILED SEPT. 13, 1916.
1,288,517.
Patented Dec. 24, 1918.
4 SHEETS—SHEET 4.
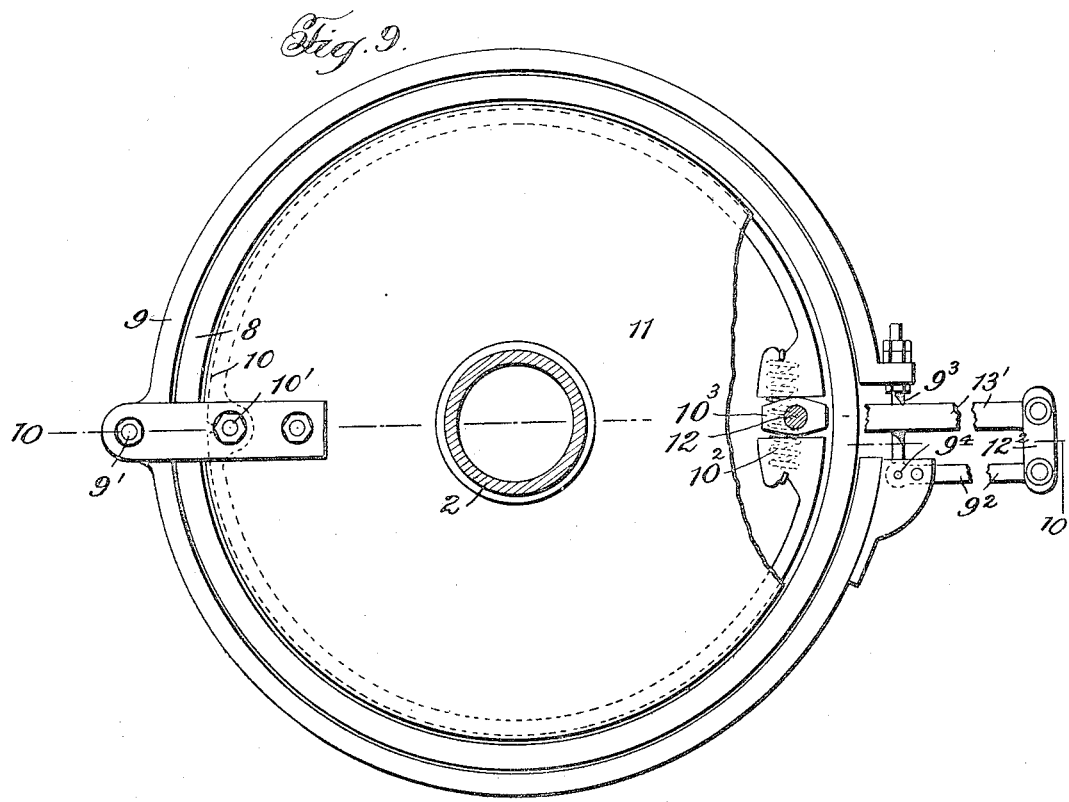
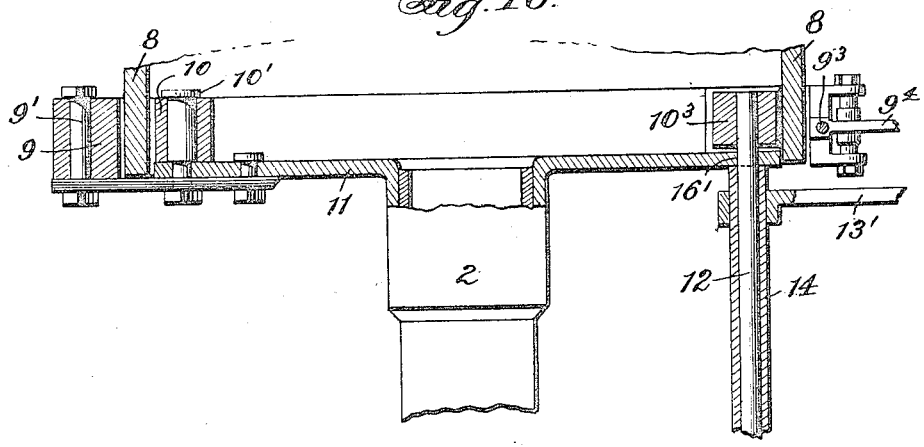
Witness:
Jas. E. Hutchinson
Inventor:
Stephen L. C. Coleman,
By Bacon & Milans Attorneys

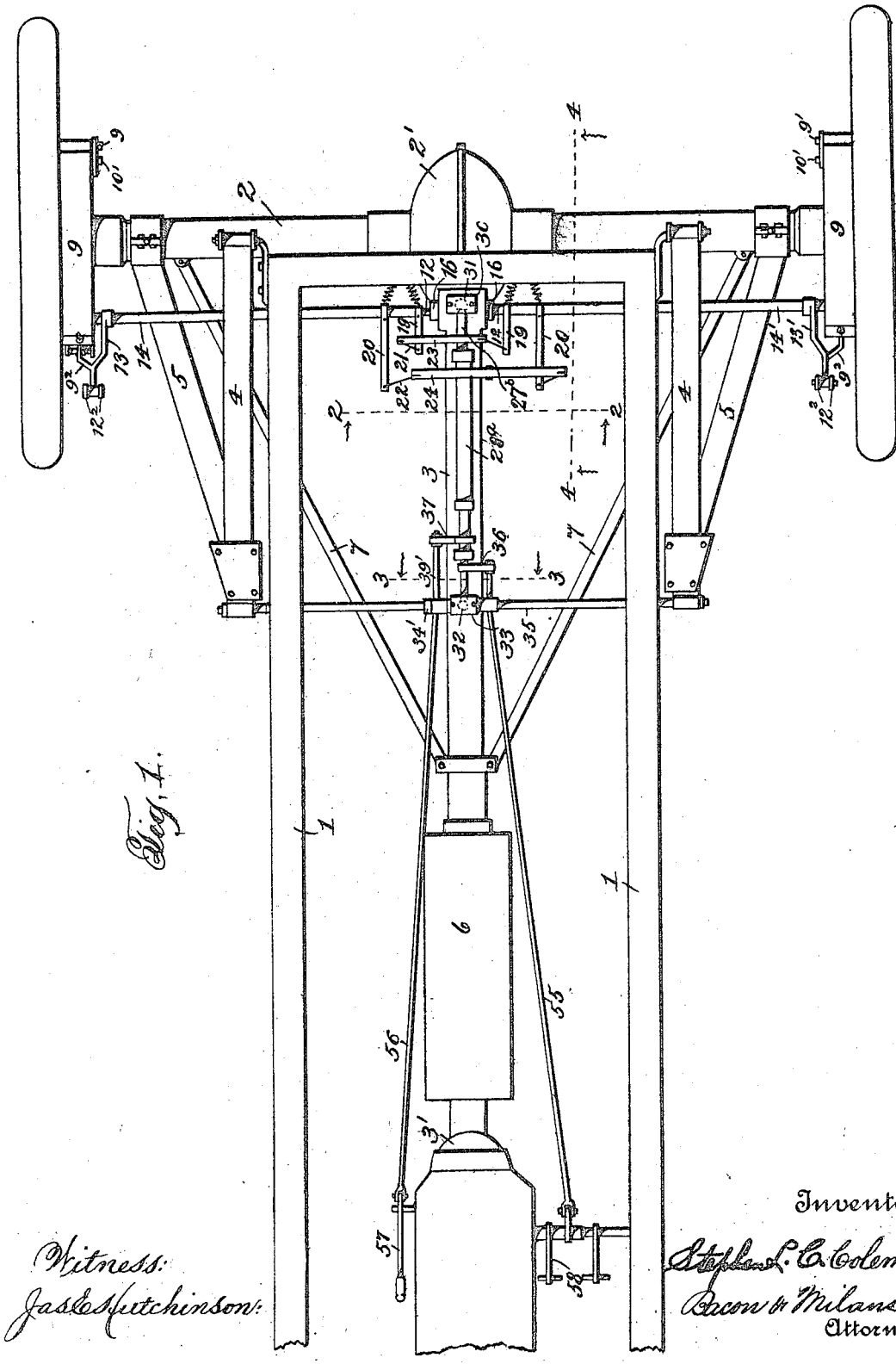

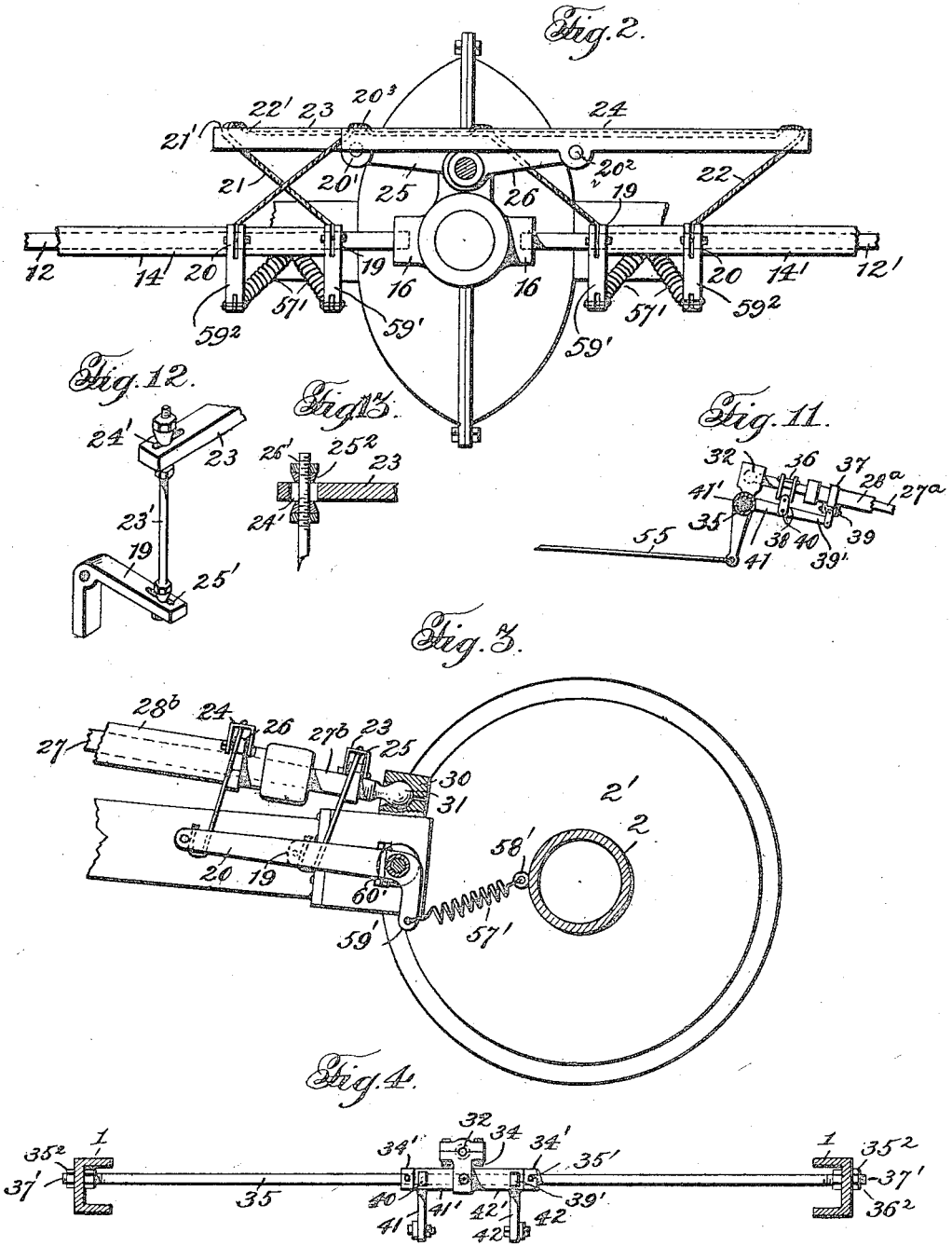

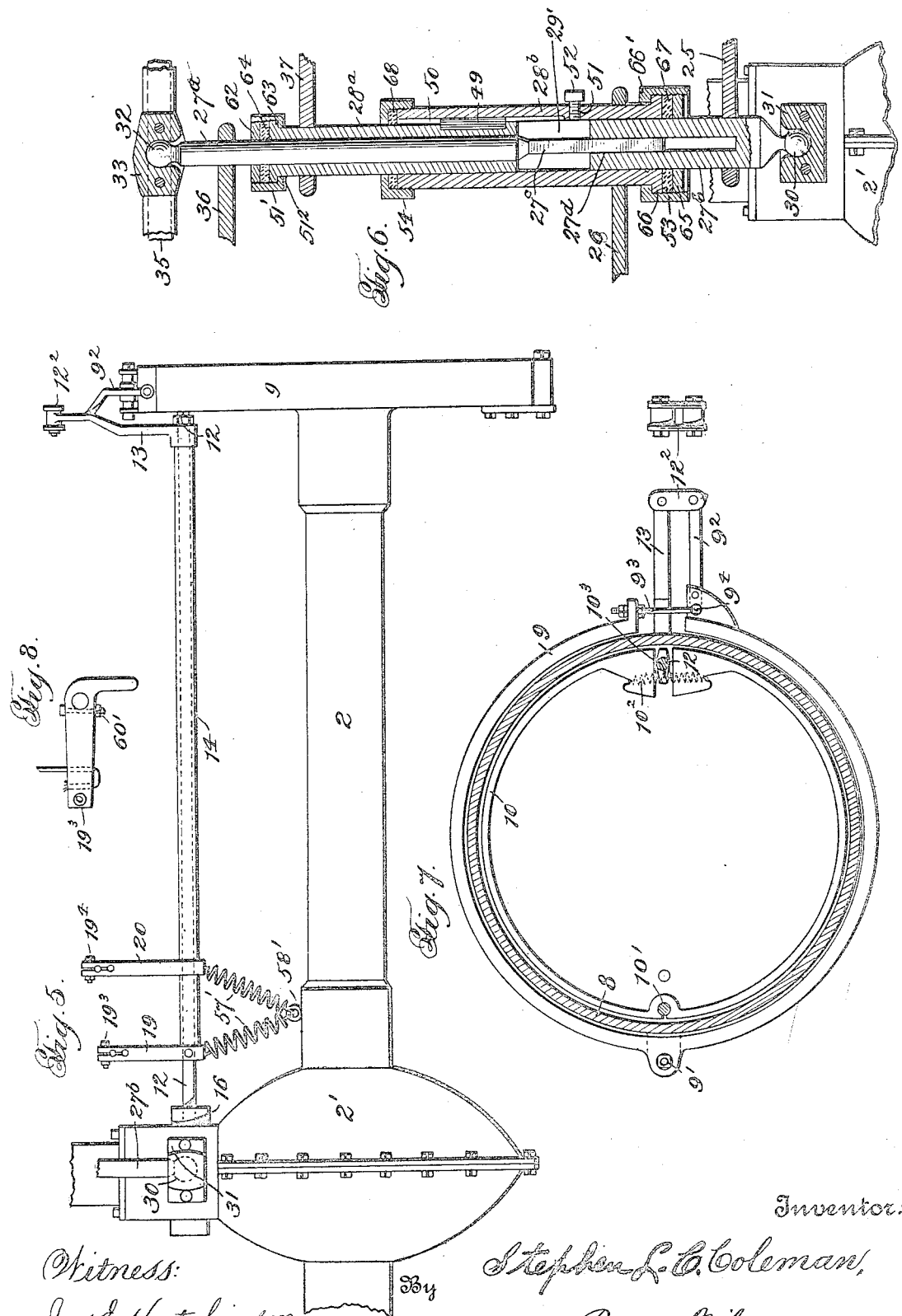

UNITED STATES PATENT OFFICE.

STEPHEN L. CHAUNCEY COLEMAN, OF FREDERICTON, NEW BRUNSWICK, CANADA, ASSIGNOR OF FORTY-NINE ONE-HUNDREDTHS TO CHARLES W. WHELPLEY, OF FREDERICTON, NEW BRUNSWICK, CANADA.

VEHICLE-BRAKE.

1,288,517.  Specification of Letters Patent.  Patented Dec. 24, 1918.

Application filed September 13, 1916. Serial No. 119,935.

*To all whom it may concern:*

Be it known that I, STEPHEN L. C. COLEMAN, a subject of the King of Great Britain, residing at Fredericton, in the county of York, New Brunswick, and Dominion of Canada, have invented certain new and useful Improvements in Vehicle-Brakes, of which the following is a specification, reference being had therein to the accompanying drawing.

The invention relates to improvements in vehicle brakes.

The primary object of the invention is to provide an improved vehicle brake in which the usual operating lever or pedal as regards the operation of the brake, is completely independent of and unaffected by the relative positions of the vehicle axle and the frame, the improved construction being primarily designed to be employed with vehicles having axles supported for horizontal cushioning or springing movement, to permit of such cushioning horizontal movements of the axle relatively to the frame without effecting the brake, but the improved construction is also adapted and advantageous for use with the various other types of motor vehicles to avoid the liability of accidental setting of the brakes by a deviation or displacement of the rear axle from its proper position.

The invention aims to provide an improved vehicle brake of this nature that will be strong, durable and efficient in use and that can be conveniently applied to the common types of motor vehicles without interference with or necessitating change of location or construction of the standard parts of the vehicle.

Another object of the invention is to provide an improved double brake system or construction having the characteristics referred to, of simple and compact form, in which the separate sets of brakes are adapted to be operated independently of each other and without interference.

It is also an object of the invention to provide an improved vehicle brake which will apply equal pressure to the brake elements at opposite sides of the vehicle.

The invention, with other objects and advantages thereof, and the particular construction, combination, and arrangement of parts comprising the same will be understood from the hereinafter contained detailed description, when considered in connection with the accompanying drawings, forming a part hereof and illustrating one embodiment of the invention.

In the drawings:

Figure 1 is a top plan view of a portion of a motor vehicle chassis equipped with a brake constructed in accordance with the present invention.

Fig. 2 is a transverse section on the line 2—2 of Fig. 1.

Fig. 3 is a section on line 4—4 of Fig. 1 looking in the direction of the arrows, the parts being shown on an enlarged scale.

Fig. 4 is a transverse section on line 3—3 of Fig. 1, looking in the direction of the arrows.

Fig. 5 is a detail top plan view, on an enlarged scale, of the braking instrumentalities at one side of the vehicle and the operating parts directly associated therewith.

Fig. 6 is a longitudinal section through the longitudinal rock shafts, the parts being shown on an enlarged scale.

Fig. 7 is a detail side elevation of the braking instrumentalities at one side of the vehicle.

Fig. 8 is a detail side elevation of one of the lever connections.

Fig. 9 is a detail side elevation of the braking instrumentalities at one side of the vehicle.

Fig. 10 is a transverse section on the line 10—10 of Fig. 9.

Fig. 11 is a detail side elevation of another of the lever connections, and

Figs. 12 and 13 are detail views of the modified form of connection between the equalizer bars and the arms of the transverse rock shafts.

In the accompanying drawings, I have illustrated a preferred embodiment of the invention. The brake mechanism is shown applied to a vehicle having its rear axle supported for cushioning or springing movement in a direction longitudinally of the frame or chassis. 1 designates the frame or chassis, 2 the rear axle housing, 2' the housing of the differential, 3 the transmission shaft housing, 3' the universal joint at the front of the transmission shaft housing, and 4 and 5 leaf springs permitting relative vertical movement between the axle and chassis. The particular means shown in the present instance for supporting the rear axle for horizontal longitudinal cushioning movement consists of a cushioning device 6 interposed in the transmission shaft housing 3, the latter being connected to the axle housing 2 by radius rods 7, said means is the same as that fully set forth and described in a companion application filed September 13, 1916, Serial No. 119,934, and for the sake of clearness I have only indicated the means referred to in a general way as it is believed this showing is sufficient in the present case.

My improved brake comprises braking elements including the usual brake drums 8 on the wheels, and two sets of braking instrumentalities coacting with the drums, one of the sets of braking instrumentalities is shown as brake bands 9 adapted to operate against the outer faces of the brake drums, and the other set of braking instrumentalities as brake bands 10 adapted to engage the inner faces of the drums. The brake bands may be of any approved type, that illustrated in the drawing being of well known construction. 11 designates the usual brake collars fixedly secured to the axle housing 2. The outer set of brake bands 9 are supported on bolts 9' secured to the brake collars 11, the outer brake bands each being provided with a toggle connection comprising a lever 9² pivoted intermediate its ends to one end of the brake band and connected with the other end of the brake band by a rod 9³, the latter having a pivotal connection 9⁴ at one end with the inner end of the lever.

The inner brake bands 10 are supported on bolts 10' secured to the brake collars 11, and each of said inner brake bands is provided with a spring 10² connecting with the ends thereof and acting to pull the ends of the bands together and to normally hold the band out of contact with the brake drum. 10³ designates cams located between the ends of the inner brake bands and adapted to be operated to force the ends of the bands apart and expand the bands into operative engagement with the inner faces of the brake drums. The brake cams 10³ are rigidly secured to the outer ends of two transversely disposed rock shafts 12—12', and the outer ends of the levers 9² are connected by links 12² to arms 13—13' at the outer ends of two transverse rock shafts 14—14'. The shafts 14—14' are tubular and each of said shafts fits over one of the shafts 12—12', the engagement between the shafts 12—12' and 14—14' being such as to permit rotation of the shafts independently of each other. The inner ends of the shafts 12—12' are mounted in bearings 16 on the differential housing and the outer ends of the inner shafts 12—12' are supported in bearings 16' on the brake collars 11, said shafts extending through the bearings to the opposite sides of the brake collars 11. The transverse rock shafts 12—12' and 14—14' Fig. 1 are provided at their inner ends respectively with forwardly extending arms 19 and 20. The ends of the inner transverse shafts 12—12' extend beyond the ends of the outer tubular shafts 14—14', the outer ends of the tubular shafts 14—14' bearing against the brake collars 11, and these shafts at their inner ends rest against one side of the arms 19, the tubular shafts 14—14' being supported upon the shafts 12—12' and held in proper position thereon against longitudinal movement.

The outer ends of the arms 19 and 20 are flexibly connected with the outer ends of the equalizer levers 23 and 24, the latter being pivotally connected centrally of their ends to the outer ends of arms 25 and 26 on two longitudinal rock shafts, one of said rock shafts being composed of telescoping sections 27ᵃ—27ᵇ, and the other longitudinal rock shaft of telescoping sections 28ᵃ—28ᵇ, the shaft sections 28ᵃ and 28ᵇ being tubular and rotatably fitting over and around the shaft sections 27ᵃ—27ᵇ. The arms 25 and 26 of the respective shafts are rigidly connected to the outer ends of the rear sections 27ᵇ and 28ᵇ respectively of said shafts and normally extend laterally and are disposed at opposite sides of the shafts. The equalizer levers are shown formed of U-shaped channel members provided centrally of their ends with depending connecting ears 20', the outer ends of the arms 25 and 26 fitting between the ears and being secured to the equalizer levers by bolts 20² passing through openings in the ears and the ends of the arms. The steel rods or cables 21 and 22 are shown as formed of a single piece of a steel cable connected at opposite ends with the outer ends of the arms and extending upwardly therefrom being threaded through openings 21'—22' in the equalizer bars and extending along the lever within the channel thereof. The forward ends of the arms 19—20 are divided as shown Figs. 5 and 8 and provided with adjusting screws 19³—19⁴ to provide clamps for the free ends of the wire cable. In Figs. 12 and 13 of the drawings, is illustrated a modified form of connection between these parts, this construction comprising a rigid connecting rod or link 23' having a loose rocking connection at opposite ends with one end of one of the equalizer levers and one of the arms 19 and 20, the equalizer levers being provided at opposite ends with elongated slots 24' and the arms with elongated slots 25' engaged by the ends of the links or rods 23', said links or rods having conical bearings at each end thereof disposed at opposite sides of the end of the equalizer bar and arm respectively. 25² designates the conical bearing members held in position on the links or rods by nuts 26′

The sections 27ᵃ—27ᵇ and the sections 28ᵃ—28ᵇ of the respective longitudinal rock shafts, are freely slidable longitudinally relatively to each other and connected for rotation together, the sections 28ᵃ—28ᵇ being free for rotation independently of the sections 27ᵃ—27ᵇ. The forward shaft section 27ᵃ has a reduced squared portion 27ᶜ that slidably fits within a squared bore 27ᵈ of the shaft section 27ᵇ. The front shaft section 28ᵃ slides within the rear section 28ᵇ, said front section having a spline or feather 49 engaging a key-way 50 in the inner face of the rear tubular section. In Fig. 3 of the drawings, the telescoping sections of the longitudinal rock shafts are shown in normal position. A chamber 29′ is provided at the interior of the outer shaft sections 28ᵃ—28ᵇ adjacent the reduced squared end portion 27ᶜ of the rear section 28ᵃ of the inner shaft, and this chamber is supplied with lubricating fluid. 51 designates an opening in the side wall of the rear section 28ᵇ through which lubricant is adapted to be supplied to the chamber 29′, said opening being closed by a screw plug 52. The inner longitudinal rock shaft Fig. 6 has a universal joint connection at one end with the differential housing 2′, and at its other end a universal joint connection with a transverse rod 35 secured to the side bars of the chassis, the rear end of the shaft having a spherical head 30 engaging a spherical socket 31 on the housing, and at the other end of the shaft 27 is a spherical head 32 engaging a spherical socket 33 on a sleeve 34, Fig. 4 rigidly secured in any suitable way on the transverse rod 35. The longitudinal rock shafts Fig. 6 are provided at their inner or forward ends with arms 36 and 37, said arms extending laterally and being disposed at opposite sides of the shafts. Inner longitudinal rock shaft 27ᵃ has an annular shoulder 62 near its front end. The forward section 28ᵃ of the outer longitudinal rock shaft has an annular shoulder 63 at one end, which is loosely engaged by a flange 51² of a collar 51′ said collar 51′ having a threaded connection with shoulder 62. 64 and 67 are packing rings. Inner longitudinal rock shaft section 27ᵇ has an annular shoulder 65 near its rear end. The rear section 28ᵇ of the outer longitudinal rock shaft has an annular shoulder 66 at its rear end which is engaged by an annular flange 66′ of collar 53 said collar having a threaded connection with shoulder collar 65. The sections of the outer tubular shaft 28ᵃ—28ᵇ are thus held in proper position respecting longitudinal movement on the inner shaft at the same time said outer shaft sections can revolve independently of the inner shaft sections 27ᵃ—27ᵇ. The rear outer section 28ᵇ at its forward end is provided with a stuffing box 54.

It will be observed that in the telescoping shaft constructions hereinbefore described, means is provided to exclude dust and dirt from the sections and for a thorough lubrication thereof to promote smooth, free and easy working of these parts upon each other.

The outer ends of the arms 36 and 37 Figs. 1 and 11 are flexibly connected by double loop toggles 38 and 39 to the outer ends of arms 39′ and 40 of bell crank levers 41 and 42. The levers 41 and 42 have tubular bearing sleeves 41′ and 42′ Fig. 4 loosely engaging rod 35 for rotation thereon, the bearing sleeves being disposed at opposite sides of the sleeve 34. The bearing sleeves are supported in position with their inner ends in engagement with opposite ends of the sleeve 34 by collars 34′ detachably secured on the rod 35 by set screws 35′ or the like. The rod 35 is rigidly secured in any suitable way to the side bars of the chassis, the rod 35 is shown supported in bearings 35² on the side bars of the chassis and clamped to the side bars by bearings or nuts 36² engaging threaded end portions 37′ of the rod 35.

Referring particularly to Figs. 1 and 4 of the drawings the arms 39′ and 40 of the bell crank levers 41 and 42 are respectively connected by reach rods 55 and 56 with manual operating levers 57 and 58, the lever 57 being shown as a hand lever, and the lever 58 as a foot lever. Referring to Figs. 2 and 3 of the drawings 57′ designates tension springs which serve to normally maintain the brake mechanism in inoperative or off position. The tension springs 57′ are connected at one end with loops or eyes 58′ secured to the axle housing and at their opposite ends with short arms 59′—59² on the shafts 12—12′ and 14—14′ at the inner ends thereof, said arms 59′—59² normally extending substantially at right angles to the forwardly extending arms 19 and 20. In the particular construction illustrated in the drawings the short arms 59′—59² are shown as formed integral respectively with the arms 19 and 20, the bell crank lever like constructions being fixedly secured to the respective shafts by transverse keys 60′.

By a forward movement of the foot lever 58 a forward rocking motion will be transmitted to the bell crank lever 41, the arm 40 of the lever will be caused to descend exerting a downward pull upon the outer end of the arm 36 on the inner longitudinal rock shaft and rotating said shaft. Upon the rotation of the shaft the arm 25 at the rear end thereof rises. The equalizer lever 23 is carried upwardly rotating the inner transverse rock shafts 12, and rotating the cams 10³ to expand the inner brake bands into engagement with the inner faces of the brake drums with equal pressure.

By pulling back upon the hand lever 57 a forward rocking movement is transmitted to the bell crank lever 42, the arm 39' of the lever descending and pulling downwardly upon the arm 37, rocking the shaft 28 and causing the arm 26 at the rear end of the shaft to rise and lift the equalizer lever 24, motion being transmitted to the brake levers 9² through the outer tubular transverse shafts 14—14' to draw the outer brake bands into engagement with the outer faces of the drums with equal pressure.

Upon releasing the operating levers 57 and 58, the parts are returned to normal inoperative position by the tension springs 57'.

It will be observed that the construction hereinbefore described is such as to compensate for any cushioning movement of the rear axle longitudinally of the chassis, the telescoping longitudinal shaft sections acting to automatically adjust themselves to all changes in the relative positions of the rear axle and the chassis including not only movements longitudinally but also movement vertically, the manual operating levers 57 and 58 being completely independent of and the tension of the brake system being entirely unaffected by changes in the relative position of the rear axle and chassis.

Upon vertical swinging movement of the longitudinal rock shafts due to rise or fall of the rear axle or changes in the relative vertical positions of the rear axle and chassis, the longitudinal rock shafts are slightly rocked about their longitudinal axes without affecting the operating levers 57 and 58. In this connection it will be noted that the pivot point of the rear axle is universal joint 3' at the forward end of the transmission shaft housing 3. This universal joint 3' is located quite a distance in advance of the ball joint 32 at the front end of the shaft section 27ª, and the shaft section 27ᵇ has a ball joint connection 30 with the axle housing so that upon the upward movement of the rear axle relative to the chassis, there is a relative swinging or pivotal movement of the transmission shaft housing and the longitudinal shafts and they are brought closer together. Referring particularly to Fig. 3 of the drawings it will be seen that the arms 19 and 20 normally extend substantially parallel with the transmission shaft housing and therefore, as in the case of the transmission shaft housing and the longitudinal shafts, there will be a relative movement between the said arms 19, 20, and the longitudinal rock shafts, said arms 19 and 20 being moved upwardly toward the equalizers 23—24. The inner ends of the arms 36—37 at the forward ends of the longitudinal rock shafts, upon the upward swinging movement of the longitudinal rock shafts relatively to the chassis, are elevated, said arms turning downwardly about their pivots. The arms 39' and 41 of the bell crank levers, which are mounted upon the chassis, are so proportioned in length relatively to the length of the arms 19 and 20, that the distance the arms 19 and 20 move upwardly toward the equalizer levers 23 and 24 will equal the distance that the arms 36 and 37 turn downwardly toward the arms 39' and 41 of the bell crank levers, whereby the movement of the parts at one end of the longitudinal rock shafts will compensate for the movements of the arms at the other ends of said rock shafts, the resulting action being simply a slight rocking of the longitudinal rock shafts without affecting the operating levers 57 and 58. Upon the downward movement of the axle relatively to the frame, or vertical separation of the axle and frame, the action of the parts is simply reversed.

While in the particular embodiment of the invention illustrated in the drawings, I have shown a double braking system, it will be understood that the invention in its broader aspect comprehends the use of either a single or double brake construction. I desire it to be also understood that variations and minor changes in the particular construction and arrangement of parts shown in the drawings, as will appeal to those skilled in the art and within the scope of the appended claims may be made without departing from the spirit of the invention.

What I claim is:

1. The combination with a vehicle of a brake comprising a braking element associated with an axle of the vehicle, and operating means therefor including a member mounted upon the vehicle frame, and a shaft connection between said member and the braking element, said shaft connection being automatically adjustable to compensate for relative movement between the vehicle frame and axle.

2. The combination with a vehicle of a brake comprising a braking element associated with an axle of the vehicle, and operating means therefor including a member mounted upon the vehicle frame and a shaft connection between said member and the braking element, said shaft connection being automatically adjustable in length to compensate for relative movement between the vehicle frame and axle.

3. The combination with a vehicle of a brake comprising a braking element associated with an axle of the vehicle, and operating means therefor including a member mounted upon the vehicle frame, and a shaft connection between said member and the braking element, said shaft connection being automatically adjustable in length and supported for swinging movement relatively to the vehicle frame and axle.

4. The combination with a vehicle of a brake comprising a braking element associated with an axle of the vehicle, and operating means therefor including a member mounted upon the vehicle frame, and a shaft connection between said member and the braking element, said shaft connection being pivotally connected with the frame and axle, and having portions freely movable longitudinally relatively to each other.

5. The combination with a vehicle, of a brake including a braking element, a rock arm supported on an axle of the vehicle and connected with the braking element, a rock arm supported on the vehicle frame and a connection between said rock arm to transmit rocking movement from one of the arms to the other, said connection comprising a rotary shaft having sections in sliding telescoping engagement and connected for rotation together, and a manual operating lever operatively connected with the rock shaft on the vehicle frame.

6. The combination with a vehicle, of a brake including a braking element, a rock arm supported on an axle of the vehicle and connected with the braking element, a rock arm supported on the vehicle frame and a connection between the rock arms to transmit rocking movement from one of the arms to the other, said connection comprising a rotary shaft having sections in sliding telescoping engagement and connected for rotation together, said shaft having a universal coupling at one end with the axle, and a universal coupling at its other end with the vehicle frame.

7. The combination with a vehicle, of a brake including a braking element and operating means comprising a transverse rock shaft supported on an axle of the vehicle and connected with the braking element, a rock arm supported on the vehicle frame, a connection between said rock shaft and rock arm to transmit rocking movement from the shaft to the arm, said connection comprising a rotary shaft having freely telescoping sections connected for rotation together, and a manual operating lever connected with said longitudinal rotary shaft.

8. The combination with a vehicle, of a brake comprising a braking element and operating means including a transverse rock shaft supported on an axle of the vehicle and connected with the braking element, an arm on the shaft, a rock arm mounted on the vehicle frame, a longitudinally extending rock shaft having an arm at one end flexibly connected with the arm of the transverse shaft on the axle, an arm at the other end of the longitudinally extending shaft flexibly connected with the arm of the rock arm on the frame, said longitudinal shaft having telescoping portions freely movable longitudinally of each other and connected to rotate together, and a manual operating lever connected with the rock shaft on the vehicle frame.

9. The combination with a vehicle, of a brake comprising a braking element and operating means including a transverse rock shaft supported on an axle of the vehicle and connected with the braking element, an arm on the shaft, a rock arm mounted on the vehicle frame, a longitudinally extending shaft having an arm at one end flexibly connected with the arm of the transverse shaft on the axle, an arm at the other end of the longitudinal shaft flexibly connected with the rock arm on the frame, said longitudinal shaft having portions in sliding telescoping engagement and connected for rotation together, and a control lever connected with the transverse shaft on the vehicle frame.

10. The combination with a vehicle, of a brake comprising two separate braking elements, and operating means including two transverse rock shafts, one of said shafts being tubular and fitting over the other shaft for rotation independently thereof, each of said shafts being connected with one of the braking elements and each having an arm, a longitudinal shaft having an arm at one end operatively connected with the arm on one of the said transverse rock shafts, a tubular longitudinal shaft fitting over the other longitudinal shaft for rotation independently thereof and having an arm at one end connected with the arm on the other transverse rock shaft, and manual operating levers connected with the shafts.

11. A vehicle brake comprising two braking elements, and operating means including two transverse rock shafts, one of said rock shafts being tubular and fitting over the other shaft for rotation independently thereof, each of said shafts being connected with one of the braking elements, a longitudinal rock shaft operatively connected at one end to one of the transverse shafts to transmit rocking motion thereto, a tubular longitudinal rock shaft fitting over the other longitudinal rock shaft for rotation independently thereof, and operatively connected at one end with the other transverse shaft to transmit rocking movement thereto, and a manual operating lever for each of said longitudinal shafts, said levers being connected with the other ends of the shafts.

12. The combination with a vehicle, of a brake comprising two separate braking elements, and operating means including two transverse rock shafts supported on the axle, one of said shafts being tubular and fitting over the other shaft for rotation independently thereof, each of said shafts being connected with one of the braking elements, a longitudinal rock shaft operatively connected at one end with one of the transverse shafts to transmit rocking movement thereto, a tubular longitudinal rock shaft fitting over the other longitudinal rock shaft for rotation independently thereof and operatively connected at one end with the other transverse rock shaft to transmit rocking movement thereto, and manual operating levers for each longitudinal shaft, said longitudinal rock shafts both having telescoping portions freely movable longitudinally of each other and connected for rotation together.

13. The combination with a vehicle, of a brake including a braking element supported on the vehicle axle, and operating means comprising a part mounted on the vehicle frame, and an operative connection between said part and said brake element, said connection consisting of a rotary shaft, having telescoping portions connected for rotation together, the telescoping portions being freely movable longitudinally of each other to automatically compensate for longitudinal movement of the axle relatively to the frame, said rotary shaft having a universal coupling at one end with the axle, and a universal coupling at its other end with the vehicle frame.

14. The combination with a vehicle, of a brake comprising two separate braking elements and operating means including rock shafts supported on an axle of the vehicle, one of said shafts being connected with one of the braking elements, and the other shaft with the other braking element, a longitudinally extending shaft having an operative connection with one of said transverse rock shafts to transmit rotary motion thereto, a tubular longitudinal rock shaft fitting over the other longitudinal rock shaft for rotation independently thereof and operatively connected at one end with the other transverse rock shaft to transmit rocking movement thereto, a manually operable lever for each of said longitudinal rock shafts operatively connected thereto, said longitudinal rock shafts each comprising sections in sliding telescoping engagement, the inner telescoping portions being arranged to provide a chamber for lubricant within one of the tubular sections of the outer longitudinal rock shaft.

15. The combination with a vehicle of a brake including braking elements at opposite sides of the vehicle, and operating means comprising transverse shafts, each of said shafts having their outer ends connected with one of the braking elements, arms at the inner ends of the shafts, an equalizing lever flexibly connected at opposite ends with the arms at the inner ends of the transverse shafts, and a longitudinal rock shaft provided at one end with an arm pivotally connected with the equalizer lever centrally of the ends thereof.

16. The combination with a vehicle, of a brake including braking elements at opposite sides of the vehicle, and operating means comprising transverse shafts supported on an axle of the vehicle, each of said shafts having their outer ends connected with one of the braking elements, arms at the inner ends of the shafts, an equalizing lever flexibly connected at opposite ends with the arms at the inner ends of the transverse shafts, a longitudinal rock shaft provided at one end with an arm pivotally connected with the equalizer levers centrally of the ends thereof, and said longitudinal rock shaft being provided with an arm at the other end thereof, and a rock arm mounted on the vehicle frame and flexibly connected to the arms at the front end of the longitudinal rock shaft.

17. The combination with a vehicle of a brake comprising a braking element associated with an axle of the vehicle, and operating means therefor including a member mounted upon the vehicle frame, and a rotary shaft connection between said member and the braking element, said rotary shaft connection having sections freely movable longitudinally relatively to each other and connected for rotation together.

18. The combination with a vehicle of two braking elements, and independent operating means for each of said braking elements, said operating means including an operating member for each braking element mounted on the vehicle frame, and an automatically adjustable rod connection between each braking element and one of said operating members, one of said adjustable rod connections being tubular and the other adjustable rod connection being arranged to extend within the first mentioned rod connection.

19. The combination with a vehicle, of two braking elements, and independent operating means for each of said braking elements, said operating means including an operating member for each braking element mounted on the vehicle frame, and a rotatable shaft connection between each braking element and one of said operating members, said rotatable shaft connections being automatically adjustable in length, one of said rotatable shaft connections being tubular and arranged over and supported upon the other adjustable rotatable shaft connection.

20. The combination with a vehicle, of a brake comprising braking elements at opposite sides of the vehicle, and operating means therefor including a longitudinally extending rock shaft having a crank arm at one end thereof, and an equalizing lever pivotally connected intermediate its ends to said crank arm and connected at opposite ends respectively with said braking elements.

21. The combination with a vehicle, of a brake comprising braking elements at opposite sides of the vehicle, and operating means therefor including a longitudinally extending rock shaft having a crank arm at one end thereof, an equalizing device connected with the said crank arm and operatively connected with both of the braking elements, and an operating member connected with said shaft.

In testimony whereof I hereunto affix my signature in the presence of two witnesses.

S. L. CHAUNCEY COLEMAN.

Witnesses:
CHAS. W. WHELPLEY,
W. W. O. FENETY.